April 12, 1938.  W. B. CAST  2,113,827
SUNSHADE
Filed March 9, 1936
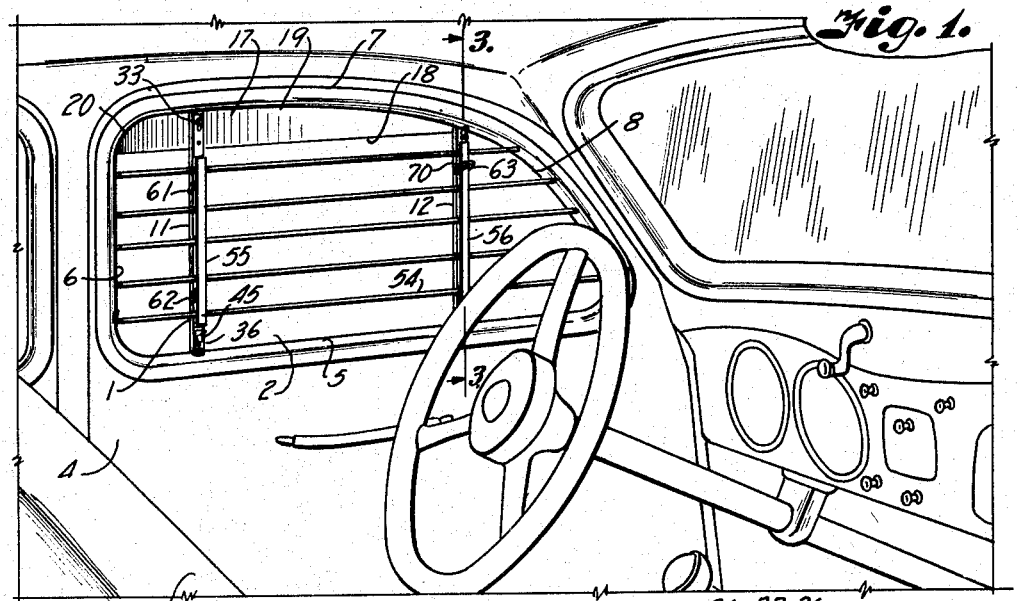
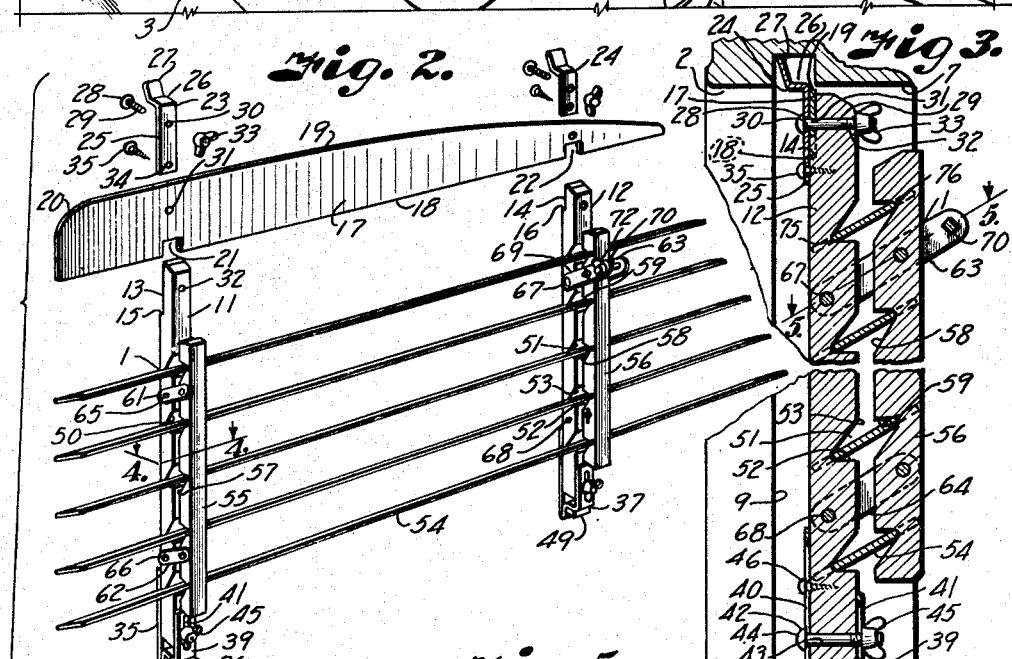
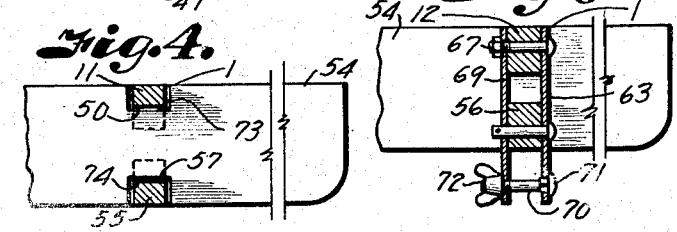
INVENTOR
William B. Cast.
BY
ATTORNEY Patented Apr. 12, 1938

2,113,827

UNITED STATES PATENT OFFICE 2,113,827

SUNSHADE

William B. Cast, Parkville, Mo.

Application March 9, 1936, Serial No. 67,902

12 Claims. (Cl. 156—17)

This invention relates to sunshades, particularly to those of the Venetian type adapted for use in automobile and similar windows, and has for its principal object to provide a Venetian shade that can be mounted as a unit within a window opening and which is of light weight, rigid construction to withstand wind velocities, vibration, and other forces acting thereagainst, particularly when used in vehicle windows.

Other important objects of the invention are to provide a window-shade constructed to exclude excessive light rays from entering a motor vehicle but which does not interfere with view from within; to provide a simple adjustable mounting of the louvers so that they will be rigidly retained in any adjusted position; to provide a shade construction that is adapted to irregular shaped window openings; to provide for mounting of the shade within the glass grooves of a window in such a manner that the shade does not interfere with raising and lowering of the glass; and to provide a shade that is readily assembled for use and disassembled into small, compact form for storage or shipping purposes.

In accomplishing these and other objects of the invention, as hereinafter pointed out, I have provided improved details of structure, the preferred form of which is illustrated in the accompanying drawing, wherein:

Fig. 1 is a perspective view of an interior of a motor vehicle body having a window thereof equipped with a Venetian shade embodying the features of the present invention.

Fig. 2 is a perspective view of the shade, the post connecting plate and anchor clips for the upper ends of the posts being shown in disassembled, spaced relation to better illustrate their construction.

Fig. 3 is a vertical section through the window on the line 3—3 of Fig. 1.

Fig. 4 is a detail horizontal section on the line 4—4 of Fig. 2.

Fig. 5 is a similar section on the line 5—5 of Fig. 3.

Referring more in detail to the drawing:

1 designates a Venetian type window-shade embodying the features of the present invention, and which is shown as installed in a window opening 2 of an automobile 3. The window opening shown is that formed in the door 4 adjacent the driver's position, however the shade may be shaped to fit within any one of the other windows of the vehicle. In the window illustrated, the sill 5 and rear stile 6 are positioned at substantially right angles to each other but the header portion 7 and forward stile 8 are formed on a substantially continuous curve extending from the upper end of the rear stile to the forward edge of the sill conforming to present stream-lining of motor vehicle bodies. Slidably mounted within the vehicle body and having the edges thereof guided in grooves 9, is a glass panel 10 for closing the window opening, as in conventional automotive construction.

The Venetian shade 1 is shaped to fit within the opening and adapted to be anchored at the inner side of the glass panel so that the glass panel may be raised and lowered without interference by the shade. The shade includes spaced posts 11 and 12 that are preferably formed of rectangular bars of slightly shorter length than the height of the window opening at the points in which they are installed.

The upper ends of the posts are notched on their outer faces, as at 13 and 14, to provide upwardly facing shoulders 15 and 16 on which a connecting plate 17 is mounted to rigidly space the upper ends of the posts. The notches 13 and 14 are of substantially the same depth as the thickness of the plate 17 so that the outer face of the plate aligns with the outer faces of the posts, as shown in Fig. 3.

The plate 17 has a substantially straight lower edge 18, but the upper edge 19 thereof conforms to the shape of the upper portion of the window opening, and the rear end 20 conforms to the rounded juncture between the side stile 6 and header portion 7 of the window, so as to close off that portion of the window opening and provide a substantially rectangular opening in which the louvers are installed, as later described. To enhance the rigidity of the connection between the posts and the plate, the lower edge of the plate is preferably provided with notches 21 and 22, adapted to engage over the shoulder portions 15 and 16 of the posts and thereby prevent any rocking movement of the posts relatively to the plate.

The plate 17 is retained in seated relation in the notches 13 and 14 by clips 23 and 24, preferably formed of metal and having strap portions 25 overlying the outer faces of the plate 17. The strap portions are preferably of sufficient length to extend below the shoulders 15 and 16 to cooperate with the posts in clamping the plate therebetween.

The upper ends of the clips are bent laterally, as at 26, in the direction of the glass groove and terminate in upwardly inclined tongues 27 to engage in the angle formed by the bottom and outer side wall of the groove, as shown in Fig. 3. The clips are retained by fastening devices, such as bolts 28, having shanks 29 extending through openings 30 in the clips and through aligning openings 31 and 32 in the plate and post respectively, the heads of the bolts engaging against the strap portion of the clips and the threaded shanks projecting through the posts to accommodate wing nuts 33 that clamp the parts rigidly together. In order to prevent lateral movement of the clips and enhance rigidity of the construction, the strap portions of the clips that extend below the shoulders 15 and 16 are provided with apertures 34 through which screws 35 are extended into the posts, as shown in Fig. 3.

The lower ends of the posts are provided with adjustable foot members 36 and 37 preferably formed of strap metal of substantially the same width as the posts and shaped to provide strap portions 38 and 39 to engage the respective sides of the post, as shown in Fig. 3. The strap portions 38 and 39 are provided with longitudinal slots 40 and 41 through which fastening devices, such as bolts 42 are extended and through aligning openings 43 in the lower ends of the posts, the heads 44 of the bolts engaging against the outer faces of the outer strap portions 38 and the threaded ends of the bolts projecting from the inner strap portions to mount wing nuts 45 to adjustably clamp the strap portions of the foot members to the post. The outer strap portions are preferably of longer length than the inner ones to accommodate a screw 46 that prevents lateral movement of the foot members on the bolts 42.

The foot members also have portions 47 connecting the strap portions and are shaped to provide depending flanges 48 in plane of the outer strap portions, as shown in Fig. 3, and which are adapted to engage within the glass groove or pocket at the edge of the window sill. To prevent marring of the window sill by the foot members, the connecting portions 47 thereof are provided with pads 49 that seat upon the window sill.

Formed in the inner faces of the posts are a plurality of notches 50 and 51 shaped to provide horizontal stop shoulders 52 and upwardly inclined faces 53 to support the louvers in horizontal position and allow pivotal movement of the louvers in an upward direction, as later described. The notches 50 and 51 extend substantially half way through the thickness of the posts, and the juncture of the inclined portions 53 with the horizontal portions 52 form fulcrums for mounting the edges of the louvers 54.

Cooperating with the posts in supporting the louvers are bars 55 and 56 having V-shaped notches 57 and 58 arranged reversely to the notches 50 and 51 as the stop shoulder portions thereof are uppermost, the bases of the notches forming fulcrums for engaging the opposite edges of the louvers, as later described.

The bars are pivotally connected with the posts by links 61, 62, 63 and 64, having one of their ends pivotally mounted on pins 65, 66, 67 and 68 extending through the posts, and their opposite ends pivotally mounted on similar pins extending through the bars, the spacing between the pivotal connections of the links being substantially equal and of suitable length so that the bar is adapted to be swung in parallel relation with the inner faces of the posts.

The link 63 is preferably of longer length than the other links so as to project beyond the inner face of the bar 56 and cooperates with a clamping link 69 that is pivotally mounted on the opposite ends of the pivots for the link 63. The ends of the clamping link 69 and the link 63 project a sufficient distance to pass a bolt 70 having a head 71 for engaging the outer face of the clamping link 69 and a threaded shank for mounting a wing nut 72 to clampingly engage the outer face of the link 63. Thus by tightening the wing nut, the link 63 and clamping link 69 are caused to frictionally engage the sides of the bar 56 to support the bar in adjusted vertical positions relatively to the post 12.

The louvers 54 comprise relatively thin slats of sufficient length to extend across the width of the window opening and are provided with aligning notches 73—74 and 75—76 having suitable width to seat over the posts and prevent lateral movement of the slats relatively thereto. The bottoms of the notches cooperate with the fulcrum points of the posts and bars so that they or the louvers are pivotally retained therebetween for tilting movement upon shifting of the bars 55 and 56.

In mounting a Venetian shade constructed and assembled as described, the wing nuts 45 for the bolts 42 are loosened and the footing members are shifted on the posts, so that when the tongues 27 are moved into the upper portion of the glass groove, as shown in Fig. 3, the flanges 48 will pass over the window sill. The footing members are then slid downwardly until the padded portions thereof are firmly seated upon the sill and the flange portions 48 are in contact with the inner edge of the sill. The wing nuts 45 are then tightened to retain the posts in position.

The slats are then adjusted to the desired angle for excluding sun-rays by shifting one of the bars upwardly, or the rays may be admitted by shifting the bar downwardly. The notches in the respective posts or bars are so related and shaped that the limit of movements of the slats is from a horizontal position to a maximum angular position, as limited by the inclined faces of the notches. It is thus obvious that it is impossible to completely shut off the slats so as to interfere with view from the interior of the vehicle, but the inclination of the slats is sufficient to cut off any glaring rays of sunlight.

The shade may be readily removed by loosening the wing nuts 45 and sliding the foot portions upwardly so that the flanges 48 thereof will clear the window sills, after which the shade may be withdrawn from the window.

The window-shade may be readily disassembled by removing the respective fastening devices securing the plate 17 and the pins which connect an end of the links to the posts. The bars are then free to be removed so that the slats may be removed from the notches. The parts may then be gathered in juxtaposed, parallel relation for packing or storage purposes.

From the foregoing, it is apparent that I have provided a window-shade for automotive use which has all of the advantages of a conventional Venetian blind in that it offers protection to the occupants of the vehicle without shutting off view from the interior thereof. The mounting of the louvers provides a very rigid and light weight construction which is not subject to rattling or destruction by wind velocities incidental to operation of the vehicle.

What I claim and desire to secure by Letters Patent is:

1. A shade of the character described in combination with a window having glass grooves in facing sides thereof, spaced posts, clips at the upper ends of the posts having tongue portions engaging in one of the glass grooves of the window, adjustable foot members on the ends of the posts and having flange portions engaging the other glass groove, a plate connecting the upper ends of the posts and conforming in shape to the upper portion of the window, louver slats carried by the posts in parallel relation with the plate, and means for adjustably supporting the louver slats on the posts.

2. In a shade of the character described, spaced posts having notches formed in one of their edges, louver slats having edges engaging in said notches of the posts, adjusting bars having notches for engaging opposite edges of the louver slats, and links pivotally connecting the adjusting bars to the posts for retaining the louver slats.

3. A shade of the character described in combination with a window having glass grooves in the facing sides thereof, spaced posts, clips at the upper ends of the posts having tongue portions engaging in one of the glass grooves of the window, foot members slidably mounted on the lower ends of the posts and having portions engaging the other glass groove, and louver slats carried by the posts.

4. In a shade of the character described, spaced posts having vertical spaced notches, louver adjusting bars having spaced notches conforming to the notches in the posts, louver slats having notches in opposite side edges thereof for fulcruming engagement with the notches of the posts and adjusting bars respectively, and links for pivotally connecting the adjusting bars with the posts to retain the louver slats.

5. In a shade of the character described, spaced posts having vertical spaced notches, louver adjusting bars having spaced notches conforming to the notches in the posts, louver slats having notches in opposite side edges thereof for fulcruming engagement with the notches of the posts and adjusting bars respectively, links for pivotally connecting the adjusting bars with the posts to retain the louver slats, and friction means engaging one of the louver adjusting bars to retain the louver slats in adjusted position.

6. In a shade of the character described, spaced posts having vertical spaced notches, louver adjusting bars having spaced notches conforming to the notches in the posts, louver slats having notches in the side edges thereof for fulcruming engagement with the notches of the posts and adjusting bars respectively, links for pivotally connecting the adjusting bars with the posts to retain the louver slats, and means cooperating with one of the links for retaining the louver slats in adjusted position.

7. A shade of the character described including spaced posts having shouldered upper ends, a plate connecting the upper ends of the posts and having notched portions engaging said shouldered ends of the posts, clips having strap portions overlying the plate and shouldered ends of the posts, fastening devices for securing said strap portions of the clips including the connecting plate to the posts, and louver slats carried by the posts.

8. A shade of the character described including spaced posts having shouldered upper ends, a plate connecting the upper ends of the posts and having notched portions engaging said shouldered ends of the posts, clips having strap portions overlying the plate and shouldered ends of the posts, fastening devices for securing said strap portions of the clips including the connecting plate to the posts, louver slats carried by the posts, and adjustable foot members on the lower ends of the posts for cooperating with the clips to retain the posts in a window opening.

9. In a device of the character described spaced pairs of rigid supporting members having a series of louver engaging seats on the facing portions of the supporting members in each pair, louver slats interposed between the supporting members and having edges thereof engaged in said seats, and means connecting the supporting members in each pair to retain the louver slats in said seats and for movement of one member in each pair relatively to the other to adjust the angle of said louver slats.

10. In a device of the character described, spaced pairs of rigid supporting members having a series of louver engaging seats on the facing portions of the supporting members in each pair, louver slats interposed between the supporting members and having notches in the edges thereof to engage in the seats of said supporting members, and means connecting the supporting members in each pair to retain the notches of the louver slats in said seats and for movement of one member in each pair relatively to the other to adjust the angle of said louver slats.

11. In a device of the character described, spaced pairs of rigid supporting members having a series of louver engaging seats on the facing portions of the supporting members in each pair, louver slats interposed between the supporting members and having edges thereof engaged in said seats, means connecting the supporting members in each pair to retain the louver slats in said seats and for movement of one member in each pair relatively to the other to adjust the angle of said louver slats, and clamping means on one of the supporting members and engageable with the complementary movable member for sustaining the louver slats in adjusted angular position.

12. In a device of the character described, spaced pairs of rigid supporting members having a series of louver engaging seats on the facing portions of the supporting members in each pair, louver slats interposed between the supporting members and having notches in the edges thereof to engage in the seats of said supporting members, means connecting the supporting members in each pair to retain the notches of the louver slats in said seats and for movement of one member in each pair relatively to the other to adjust the angle of said louver slats, and clamping means on one of the supporting members and engageable with the complementary movable member for sustaining the louver slats in adjusted angular position.

WILLIAM B. CAST.